(12) United States Patent
Couelier

(10) Patent No.: US 11,209,976 B2
(45) Date of Patent: Dec. 28, 2021

(54) SYSTEM AND METHOD FOR EDITING INPUT MANAGEMENT

(71) Applicant: MyScript, Nantes (FR)

(72) Inventor: Joel Couelier, Nantes (FR)

(73) Assignee: MYSCRIPT, Nantes (FR)

( * ) Notice: Subject to any disclaimer, the term of this patent is extended or adjusted under 35 U.S.C. 154(b) by 0 days.

(21) Appl. No.: 15/269,164

(22) Filed: Sep. 19, 2016

(65) Prior Publication Data

US 2017/0315719 A1    Nov. 2, 2017

(30) Foreign Application Priority Data

Apr. 29, 2016   (EP) ..................................... 16290074

(51) Int. Cl.
*G06F 3/0488*   (2013.01)
*G06F 40/166*   (2020.01)
*G06F 3/0481*   (2013.01)

(52) U.S. Cl.
CPC ........ *G06F 3/04883* (2013.01); *G06F 3/0481* (2013.01); *G06F 3/04886* (2013.01); *G06F 40/166* (2020.01); *G06F 2203/0381* (2013.01)

(58) Field of Classification Search
CPC ............. G06F 3/04883; G06F 3/04886; G06F 2203/0381
See application file for complete search history.

(56) References Cited

U.S. PATENT DOCUMENTS

| | | | |
|---|---|---|---|
| 7,571,384 B1 | 8/2009 | Webb | |
| 8,116,569 B2 | 2/2012 | Markiewicz et al. | |
| 8,276,101 B2 | 9/2012 | Li | |
| 2003/0164861 A1* | 9/2003 | Barbanson | G06F 3/0485 715/815 |
| 2004/0071344 A1* | 4/2004 | Lui | G06F 3/038 382/181 |
| 2013/0113717 A1 | 5/2013 | Van Eerd et al. | |
| 2015/0193141 A1 | 7/2015 | Goldsmith et al. | |
| 2016/0070462 A1 | 3/2016 | Baudry et al. | |
| 2016/0070466 A1* | 3/2016 | Chaudhri | G06F 3/0484 715/765 |
| 2017/0132187 A1* | 5/2017 | Contreras | G06F 40/205 |

OTHER PUBLICATIONS

European Patent Office, International Search Report and Written Opinion for related international Application No. PCT/EP2017/000526, dated Aug. 10, 2017, 11 pages.
International Bureau of WIPO, International Preliminary Report on Patentability for related international application No. PCT/EP2017/000526, dated Nov. 8, 2018, 8 pages.

* cited by examiner

*Primary Examiner* — Tuan S Nguyen
(74) *Attorney, Agent, or Firm* — McDermott Will & Emery LLP

(57) ABSTRACT

A system, method, and computer program product for managing editing of content on computing devices are provided. An input field for accepting input of a first type is displayed on an interface. An interaction field for accepting input of a second type displayed in place of the input field based on detection of a first interaction with the interface is displayed on the interface, wherein the interaction field displays first content based on the first input type. A second interaction with the first content is detected based on recognition of the second type input. The first content is modified based on detected second interaction.

18 Claims, 14 Drawing Sheets

SYSTEM AND METHOD FOR EDITING INPUT MANAGEMENT

CROSS-REFERENCE TO RELATED APPLICATIONS

This application claims priority to European Application No. 16290074.0 filed on Apr. 29, 2016, the entire contents of which are incorporated herein.

TECHNICAL FIELD

The present description relates generally to the field of computer input systems and methods using computing device interfaces. The present description relates more specifically to systems and methods for handwriting input for editing content via a user interface (UI) for recognition.

BACKGROUND

Computing devices continue to become ubiquitous to daily life. They take the form of computer desktops, laptop computers, tablet computers, hybrid computers (2-in-1s), e-book readers, mobile phones, smartphones, wearable computers (including smartwatches, smart glasses/headsets), global positioning system (GPS) units, enterprise digital assistants (EDAs), personal digital assistants (PDAs), game consoles, and the like. Further, computing devices are being incorporated into vehicles and equipment, such as cars, trucks, farm equipment, manufacturing equipment, building environment control (e.g., lighting, HVAC), and home and commercial appliances.

Computing devices generally consist of at least one processing element, such as a central processing unit (CPU), some form of memory, and input and output devices. The variety of computing devices and their subsequent uses necessitate a variety of interfaces and input devices. One such input device is a touch sensitive surface such as a touch screen or touch pad wherein user input is received through contact between the user's finger or an instrument such as a pen or stylus and the touch sensitive surface. Another input device is an input surface that senses gestures made by a user above the input surface. A further input device is a position detection system which detects the relative position of either touch or non-touch interactions with a non-touch physical or virtual surface. Any of these methods of input can be used generally for input through interaction with a displayed (virtual or on-screen) keyboard or through drawing or writing. When user input is drawn or written, the user's handwriting is typically interpreted using a handwriting recognition system or method.

Virtual or 'soft' keyboards are widely used now and many options and applications beyond those that come standard with portable (and non-portable) computing devices are available. However, managing insertion of content by virtual keyboard into existing content or the like constitutes a real challenge as it generally requires particular user interactions or gestures to be performed. This is because virtual keyboards usually have limited functionality due to available display space on-screen and lack interactive tools, such as a mouse, which traditionally accompany keyboards. Some conventional techniques require the use of keyboard keys or UI buttons with repeated action, e.g., backspace or space, when inserting or removing text content, for example.

These conventional techniques also require management of an input cursor which is not sufficiently accurate on small display devices and requires users to perform time-consuming adjustment before being able to perform the action desired, such as edit, delete or insert text, at the location desired, thereby reducing the productivity of the input interface and limiting application to devices having larger interfaces. Other conventional techniques require the user to insert content for editing existing content into a dedicated editing field which is separate from the usual input field, thereby reducing the ergonomics of the input interface and limiting application to devices having larger interfaces.

There are many applications of handwriting recognition in portable computing devices like smartphones, phablets and tablets, such as is in note taking, document annotation, mathematical equation input and calculation, music symbol input, sketching and drawing. These types of input are usually performed by the user launching a handwriting input application on the computing device which accepts and interprets, either locally in the device or remotely via a communications link of the device, handwritten input on the touch sensitive surface and displays or otherwise renders this input as so-called 'digital ink'.

It may be possible to use such handwriting input in place of keyboards on such devices in order to allow content creation and insertion of content. However, the Applicant has found that users do not like using handwriting extensively on electronic devices, particular those with smaller screens, such as smartphones and phablets, particularly when a relatively large amount of content is to be input, e.g., the writing of an email message versus a TWITTER® message. This is exacerbated by the manner of handwriting entry currently available and contemplated for digital handwriting applications, in which a limited amount of content can be input in a relatively short timeframe. For example, US Patent Application Publication No. US 2015/0193141 describes a relatively complex handwriting input panel for entry of multiple characters making up words and sentences.

Alternatively, handwriting could be used to supplement keyboard input by providing relatively fast input of single or few text and non-text characters, particularly when inserting this content into existing content. Such multiple entry systems have been proposed. For example, U.S. Pat. No. 6,661,920 describes a system for accepting input from keyboard and handwriting and U.S. Pat. No. 6,788,815 describes a system for accepting input from keyboard and handwriting, and from speech. In both of these patents, discrete input panels are used for the entry of typing and handwriting with a complicated non-intuitive method of switching between input modes. This need to provide individual input areas on the interface surface of the computing device is clearly not applicable to smaller-screen devices.

SUMMARY

The examples of the present invention that are described herein below provide systems and methods for managing editing of content on computing devices.

In one example, a system is provided for managing editing of content on computing devices. Each computing device may include a processor and at least one non-transitory computer readable medium for recognizing input under control of the processor. The one non-transitory computer readable medium may configured to cause display of, on a display interface of a computing device, an input field for accepting input of a first type, cause display of, on the display interface, an interaction field for accepting input of a second type in place of the display of the input field based on detection of a first interaction with the display interface, the interaction field including display of first content based on the first input type, detect a second interaction with the first content based on recognition of the second type input, and cause modification of the first content based on detected second interaction. The non-transitory computer readable medium may also be configured to cause display of, on the display interface, the input field in place of the interaction field based on detection of the first interaction with the display interface.

The input field may be a virtual keyboard layout and the first input type input may be typing. The interaction field may be a handwriting panel and the second input type input may be handwriting. The first interaction may be a first pre-determined type and the second interaction may be a second pre-determined type, and the first and second pre-determined types may be different. The second pre-determined type may comprise any one of a content overwriting gesture, a content deletion gesture and a content space insertion gesture.

In another example, a method is provided for managing editing of content on computing devices. Each computing device may include a processor and at least one non-transitory computer readable medium for recognizing input under control of the processor. The method may include the steps of displaying an input field for accepting input of a first type, displaying an interaction field for accepting input of a second type in place of the display of the input field based on detection of a first interaction, the interaction field including display of first content based on the first input type, detecting a second interaction with the first content based on recognition of the second type input, and modifying the first content based on detected second interaction. The method may also include the step of displaying the input field in place of the interaction field based on detection of the first interaction.

The input field may be a virtual keyboard layout and the first input type input may be typing. The interaction field may be a handwriting panel and the second input type input may be handwriting. The first interaction may be a first pre-determined type and the second interaction may be a second pre-determined type, and the first and second pre-determined types may be different. The second pre-determined type may comprise any one of a content overwriting gesture, a content deletion gesture and a content space insertion gesture.

In another example, a non-transitory computer readable medium having a computer readable program code embodied therein is provided. The computer readable program code may be adapted to be executed to implement a method for managing editing of content on computing devices. Each computing device may include a processor and at least one non-transitory computer readable medium for recognizing input under control of the processor. The method may include the steps of displaying an input field for accepting input of a first type, displaying an interaction field for accepting input of a second type in place of the display of the input field based on detection of a first interaction, the interaction field including display of first content based on the first input type, detecting a second interaction with the first content based on recognition of the second type input, and modifying the first content based on detected second interaction. The method may also include the step of displaying the input field in place of the interaction field based on detection of the first interaction.

The input field may be a virtual keyboard layout and the first input type input may be typing. The interaction field may be a handwriting panel and the second input type input may be handwriting. The first interaction may be a first pre-determined type and the second interaction may be a second pre-determined type, and the first and second pre-determined types may be different. The second pre-determined type may comprise any one of a content overwriting gesture, a content deletion gesture and a content space insertion gesture.

BRIEF DESCRIPTION OF THE DRAWINGS

The present system and method will be more fully understood from the following detailed description of the examples thereof, taken together with the drawings. In the drawings like reference numerals depict like elements. In the drawings.

DETAILED DESCRIPTION

Figure 1:
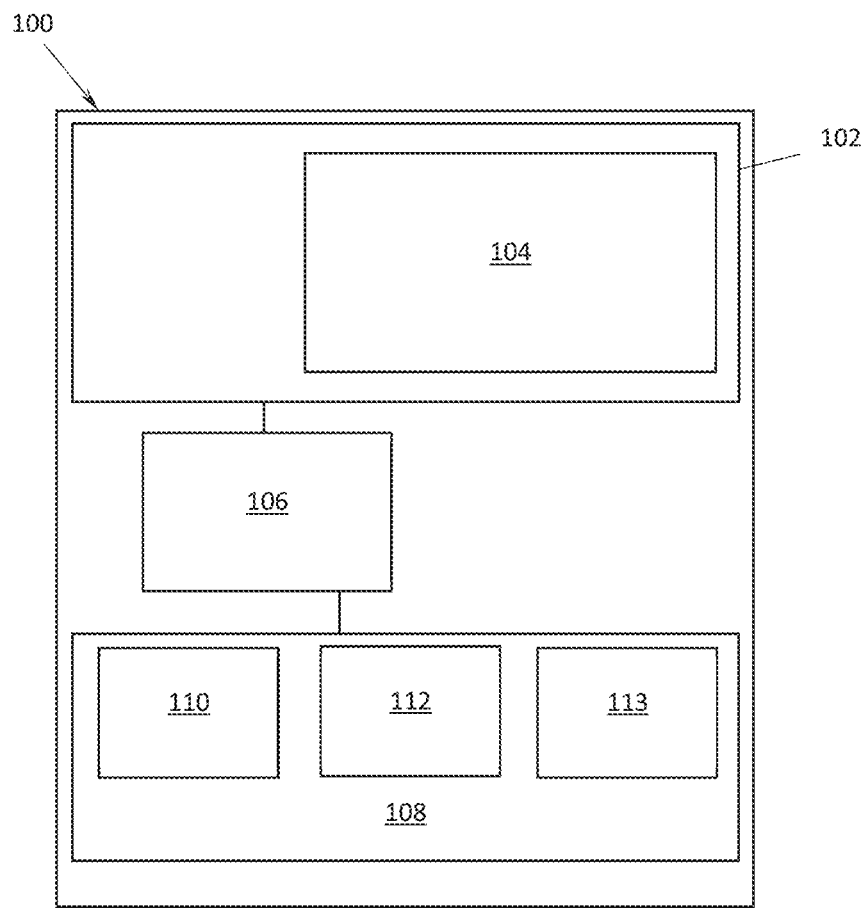
FIG. 1 shows a block diagram of a computing device in accordance with an example of the present system and method.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference to and discussion of directional features such as up, down, above, below, lowest, highest, horizontal, vertical, etc., are made with respect to the Cartesian coordinate system as applied to the input surface on which the input to be recognized is made. Further, terms such as left and right are made in relation to the reader's frame of reference when viewing the drawings. Furthermore, the use of the term 'text' in the present description is understood as encompassing all alphanumeric characters, and strings thereof, in any written language and common place non-alphanumeric characters, e.g., symbols, used in written text. Further still, the term 'non-text' in the present description is understood as encompassing freeform handwritten or hand-drawn content and rendered text and image data, as well as non-alphanumeric characters, and strings thereof, and alphanumeric characters, and strings thereof, which are used in non-text contexts. Furthermore, the examples shown in these drawings are in a left-to-right written language context, and therefore any reference to positions can be adapted for written languages having different directional formats.

The various technologies described herein generally relate to capture, processing and management of hand-drawn and handwritten content on portable and non-portable computing devices in a manner which retains the inputted style of the content while allowing conversion to a faithful typeset or beautified version of that content. The systems and methods described herein may utilize recognition of users' natural writing and drawing styles input to a computing device via an input surface, such as a touch sensitive screen, connected to, or of, the computing device or via an input device, such as a digital pen or mouse, connected to the computing device or via a physical or virtual surface monitored by a position detection system. Whilst the various examples are described with respect to recognition of handwriting input using so-called online recognition techniques, it is understood that application is possible to other forms of input for recognition, such as offline recognition in which images rather than digital ink are recognized. The terms hand-drawing and handwriting are used interchangeably herein to define the creation of digital content by users through use of their hands either directly onto a digital or digitally connected medium or via an input tool, such as a hand-held stylus. The term "hand" is used herein to provide concise description of the input techniques, however the use of other parts of a users' body for similar input is included in this definition, such as foot, mouth and eye.

FIG. 1 shows a block diagram of an example computing device 100. The computing device may be a computer desktop, laptop computer, tablet computer, e-book reader, mobile phone, smartphone, wearable computer, digital watch, interactive whiteboard, global positioning system (GPS) unit, enterprise digital assistant (EDA), personal digital assistant (PDA), game console, or the like. The computing device 100 includes components of at least one processing element, some form of memory and input and/or output (I/O) devices. The components communicate with each other through inputs and outputs, such as connectors, lines, buses, cables, buffers, electromagnetic links, networks, modems, transducers, IR ports, antennas, or others known to those of ordinary skill in the art.

In the example shown, the computing device 100 has at least one display 102 for outputting data from the computing device such as images, text, and video. The display 102 may use LCD, plasma, LED, iOLED, CRT, or any other appropriate technology that is or is not touch sensitive as known to those of ordinary skill in the art. At least some of the display 102 is co-located with at least one input surface 104. The input surface 104 may employ technology such as resistive, surface acoustic wave, capacitive, infrared grid, infrared acrylic projection, optical imaging, dispersive signal technology, acoustic pulse recognition, or any other appropriate technology as known to those of ordinary skill in the art to receive user input. The input surface 104 may be bounded by a permanent or video-generated border that clearly identifies its boundaries. Alternatively, the computing device may include the input surface independent of, or without, a display. In the case of a device having no display, input made via the input surface is not displayed by the computing device, rather the device acts as an input device only with the recognized input (discussed later) used for control input, for example, or displayed as content on a connected device or dedicated display device.

In addition to the input surface 104, the computing device 100 may include one or more additional I/O devices (or peripherals) that are communicatively coupled via a local interface. The additional I/O devices may include input devices such as a keyboard, mouse, scanner, microphone, touchpads, bar code readers, laser readers, radio-frequency device readers, or any other appropriate technology known to those of ordinary skill in the art. Further, the I/O devices may include output devices such as a printer, bar code printers, or any other appropriate technology known to those of ordinary skill in the art. Furthermore, the I/O devices may include communications devices that communicate both inputs and outputs such as a modulator/demodulator (modem; for accessing another device, system, or network), a radio frequency (RF) or other transceiver, a telephonic interface, a bridge, a router, or any other appropriate technology known to those of ordinary skill in the art. The local interface may have additional elements to enable communications, such as controllers, buffers (caches), drivers, repeaters, and receivers, which are omitted for simplicity but known to those of skill in the art. Further, the local interface may include address, control, and/or data connections to enable appropriate communications among the other computer components.

The computing device 100 also includes a processor 106, which is a hardware device for executing software, particularly software stored in a memory 108. The processor can be any custom made or commercially available general purpose processor, a central processing unit (CPU), commercially available microprocessors including a semiconductor based microprocessor (in the form of a microchip or chipset), microcontroller, digital signal processor (DSP), application specific integrated circuit (ASIC), field programmable gate array (FPGA) or other programmable logic device, discrete gate or transistor logic, discrete hardware components, state machine, or any combination thereof designed for executing software instructions known to those of ordinary skill in the art.

The memory 108 can include any one or a combination of volatile memory elements (e.g., random access memory (RAM, such as DRAM, SRAM, or SDRAM)) and nonvolatile memory elements (e.g., ROM, EPROM, flash PROM, EEPROM, hard drive, magnetic or optical tape, memory registers, CD-ROM, WORM, DVD, redundant array of inexpensive disks (RAID), another direct access storage device (DASD), or any other magnetic, resistive or phase-change nonvolatile memory). Moreover, the memory 108 may incorporate electronic, magnetic, optical, and/or other types of storage media. The memory 108 can have a distributed architecture where various components are situated remote from one another but can also be accessed by the processor 106. Further, the memory 108 may be remote from the device, such as at a server or cloud-based system, which is remotely accessible by the computing device 100. The memory 108 is coupled to the processor 106, so the processor 106 can read information from and write information to the memory 108. In the alternative, the memory 108 may be integral to the processor 106. In another example, the processor 106 and the memory 108 may both reside in a single ASIC or other integrated circuit.

The software in the memory 108 includes an operating system 110 and an input management system 112. The software optionally further includes an input recognition system 113 which may each include one or more separate computer programs. Each of these has an ordered listing of executable instructions for implementing logical functions. The operating system 110 controls the execution of the input management system 112 (and the input recognition system 113), or may incorporate the functions of the input management system 112 (and the input recognition system 113). The operating system 110 may be any proprietary operating system or a commercially or freely available operating system, such as WEBOS, WINDOWS®, MAC and IPHONE OS®, LINUX, and ANDROID. It is understood that other operating systems may also be utilized.

The input management system 112 includes one or more processing elements related to detection, management and treatment of user input (discussed in detail later). The software may also include one or more applications related to input recognition, different functions, or both. Some examples of other applications include a text editor, telephone dialer, contacts directory, instant messaging facility, computer-aided design (CAD) program, email program, word processing program, web browser, and camera. The input management system 112, and the applications, include program(s) provided with the computing device 100 upon manufacture and may further include programs uploaded or downloaded into the computing device 100 after manufacture.

The input management system 112 of the present system and method manages input into the computing device 100 via the interface surface 104, for example. Input is managed through the provision of input tools to users and the handling of the input for processing and the like. The input tools include the provision and display of dedicated input areas or fields on the interface surface 104 or the provision of the (substantially) entire interface surface 104 (e.g., the input field substantially represents the entire input surface) for the receipt of user input via interaction with the touch sensitive interface surface 104. The dimensions and functionality of these input areas are provided in correspondence with, and responsive to, the dimensions and orientation of the display area of the device display 102 in a manner well understood by those skilled in the art.

Figure 2:
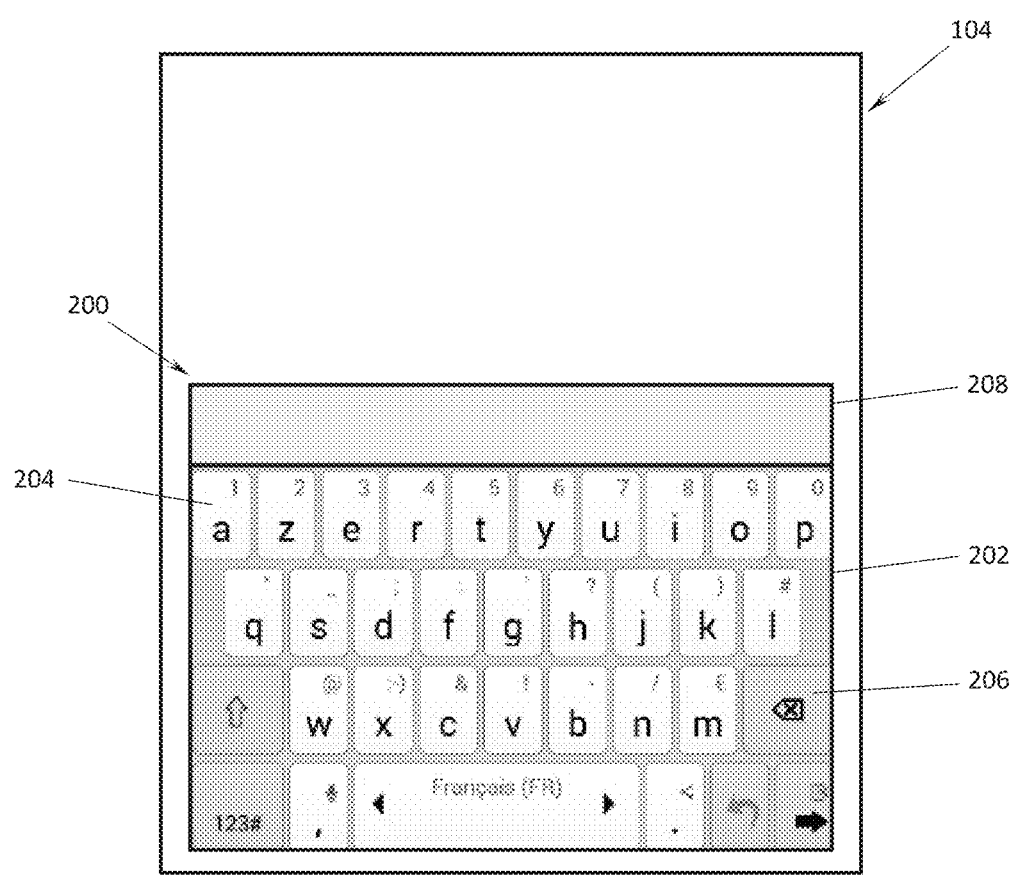
FIG. 2 shows a schematic view of an example visual rendering of an input area provided by an input management system on a portion of an input surface of the computing device in accordance with an example of the present system and method.

FIG. 2 shows an example input area or field 200 displayed by the input management system 112 on the interface surface 104. The input area 200 is an area or zone of the display of the computing device 100 which is to be used for the input of content and/or control gestures by users. Any digital device user is already accustomed to gesturing on screen to type or write content and to enter control commands for application and device navigation, content editing, etc. Such interactions with the interface surface 104 of the computing device 100 are generally detected by the processor 106 and this information is communicated to the input management system 112 for interpretation and recognition processing.

The input area 200 includes an input panel 202 for receiving user input through single-point or single-position gestures or interactions, such as tap, short or long press, multi-point or multi-position gestures or interactions, such as double tap, and stroke gestures, such as swipe. In order to translate these gestures to input of specific content or commands, the input panel 202 may display a keyboard layout such as the 'azerty' style keyboard layout variant of the 'qwerty' keyboard layout shown in FIG. 2.

This keyboard layout is merely an example, and many other known keyboard layouts and methods, e.g., qwerty or azerty mapped layouts for language specific variants like BoPoMoFo, Hangul, JIS, phonetic, non-qwerty layouts for different languages like Hanyu Pinyin, Jeuken, InScript, reduced keyboard, such as T9 or T12, or yet-to-be-developed keyboard layouts, are applicable to the present system and method used either singularly with respect to the computing device or selectively by storage of different keyboard layouts in the memory 108, for example, accessed via keys of the keyboard or UI buttons or the like. Further, layouts that provide access to non-alphabetic characters, such as numerals, grammatical marks, emojis, etc. are also applicable, typically selectively.

As discussed, the example input panel 202 of FIG. 2 includes a keyboard layout for accepting a first type of input, i.e., typing. The keyboard layout has content keys 204 which when interacted with by users, such as through a single-point gesture or 'strike' thereon or over, result in the input of content, and command keys 206 which when interacted with by users, such as through a single-point gesture or strike thereon or over, result in the input of control commands, e.g., applying a tap on the "backspace" key causes the backspacing deletion of previously input characters, or launching of keyboard sub- or dedicated layouts, e.g., special character layouts having keys for numerals, grammatical marks, emojis, language specific layouts as described above, language alternatives layouts providing access to accents, character alternatives based on strokes, etc. Both the content and command keys are generally displayed with character depictions corresponding to the content or command input which results from interaction with that key.

The input panel 202 may be displayed upon the receipt of certain user actions, such as the launching of an application on the computing device 100, or interaction with components of that application such as a menu, for example, for the input of content. However, the present system and method is not restricted to such a mechanism, and the input panel 202 may be provided for the receipt of user input whenever and at any time the interface surface 104 is active, e.g., able to accept user interaction. This is particularly the case where the input panel corresponds substantially to the entire interface surface, such that user interaction with the interface surface represents interaction with the input panel.

Figure 3:
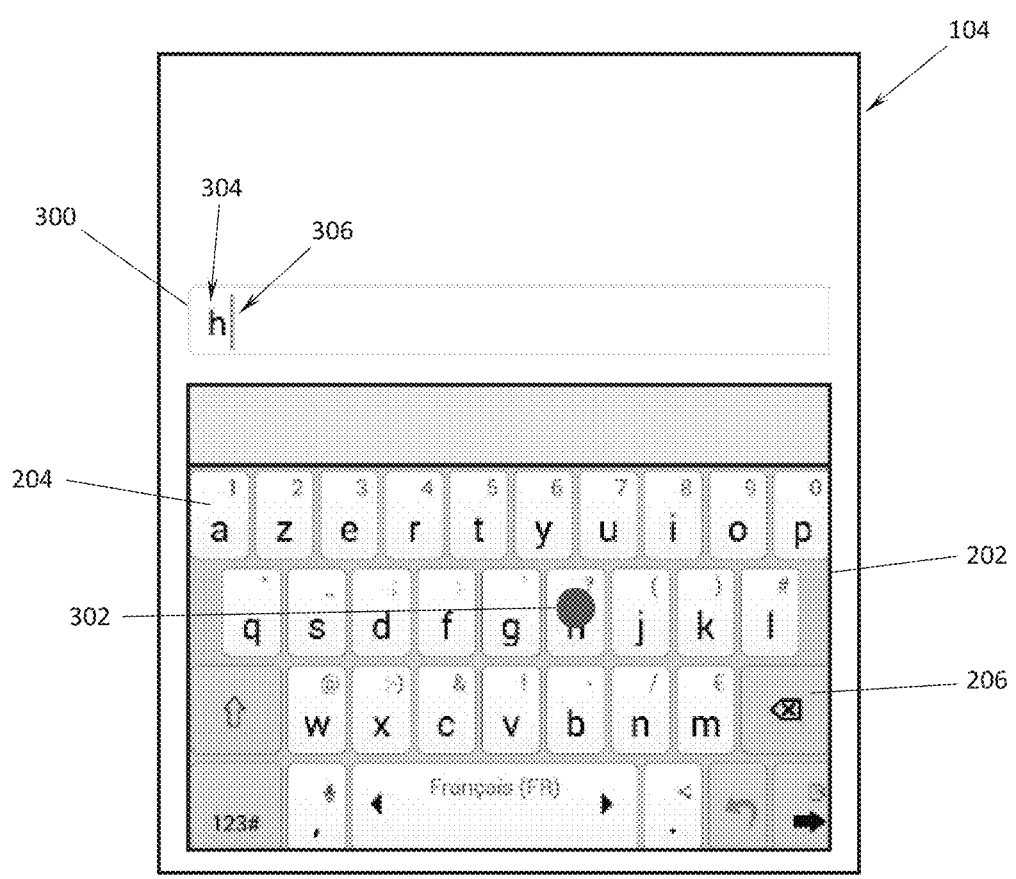
FIG. 3 shows the input area with a depiction of example received input of a first type and consequential display of recognized content in a content display area provided by the input management system on another portion of the input surface in accordance with an example of the present system and method.

In the example depicted in the accompanying drawings, input of content via the input panel 202 may cause the rendered display of the content elsewhere on the display 102, such as a content display area or zone 300 shown in FIG. 3. The display area or field 300 may be a component of an active application of the computing device 100, for example. It is understood that the display area is merely an example, and other forms and configurations of a display zone, or use of the entire display of the device, are also applicable. In the example of FIG. 3, an interaction 302, such as a tap, on the "h" key 204 of the displayed keyboard layout causes the letter "h" to be input as content. As a result, the input management system 112 causes display of corresponding content 304 in the display area 300 as a recognized object, shown as the input character "h" rendered in typeset or fontified ink.

In the drawings, interactions such as the interaction 302 are illustrated with a solid circular form roughly indicating the extent of the interaction with the interface surface 104 of the digital device 100. This illustration is merely for the purposes of example and may or may not be actually displayed during (and after) the interactions.

In the present system and method the input management system 112 causes display of the input content either directly or via communication of the input to the active application and/or operating system 110, for example, in a manner similar to that conventionally employed by operating systems and components and applications thereof. That is, the content input to the computing device 100 by typing using the keyboard is recognized and interpreted by a keyboard or typing decoder (discussed in detail later) using logic, such a fuzzy logic for example, and each element of the content, e.g., characters, symbols, grammatical marks, emojis, words containing the characters, sentences containing the words and the symbols, etc., paragraphs containing the sentences, is encoded in the digital content. This digital content is handled by the computing device 100 in a well understood manner, with each digital character treated as a digital object. In this way, functions such as input or editing cursor placement for interaction with the digital content can be made in relation to each digital object.

Figure 4:
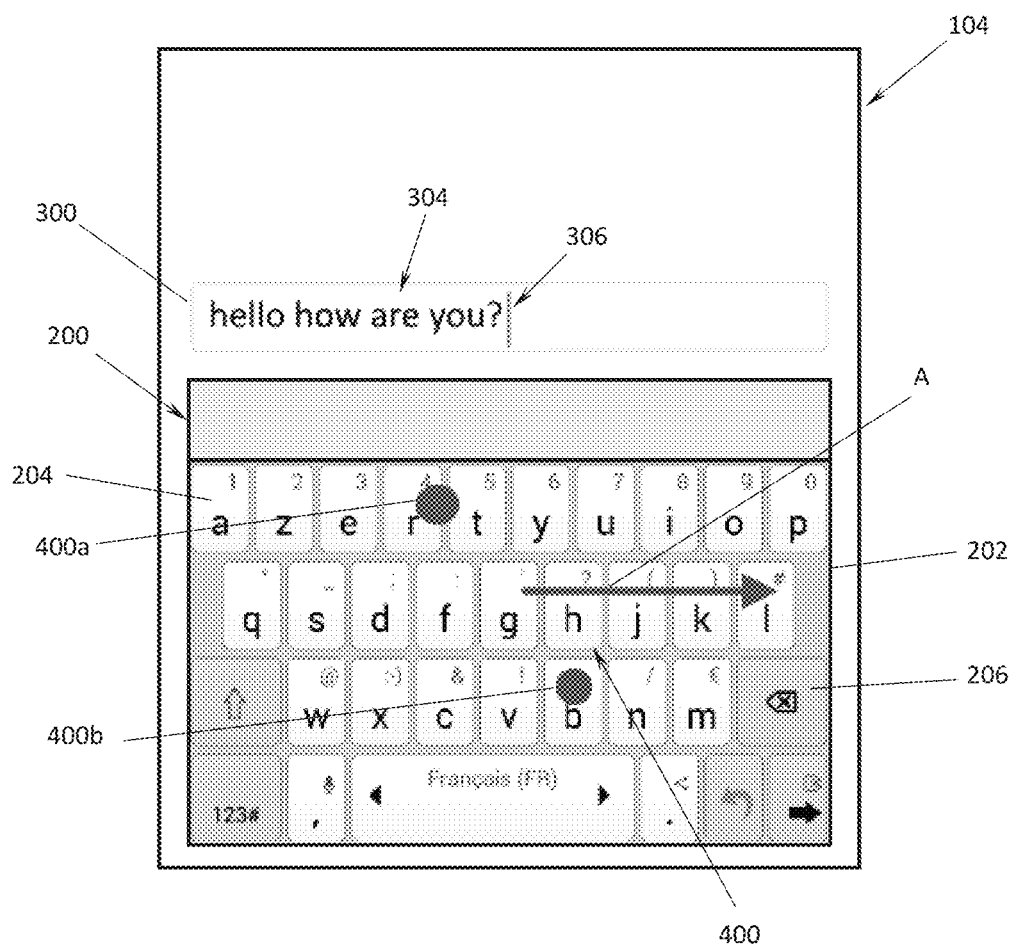
FIG. 4 shows the input area with a depiction of further example received first type input and consequential display of recognized content in the content area.

FIG. 4 shows the result of continued input via 'touch' typing on the keyboard of the input panel 202. That is, the keys 204 have been further 'tapped' to add to the content 304 displayed in the display area such that the displayed content 304 is updated as including one or more recognized objects, e.g., corresponding to the words and question mark "hello how are you?". Such a touch typing method is an example, and the present system and method is applicable for other methods typing methods such as stroke-like input, e.g., SWYPE®, SWIFTKEY® and TOUCHPAL® keyboards.

As content beyond what can be displayed in the display area 300 is input, the recognized content displayed therein may be scrolled from view in the display area, for example, in a manner governed by the content application or for example as described in United States Patent Publication No. 2016/0070462 filed in the name of the present Applicant and Assignee, the entire contents of which is incorporated by reference herein.

It is noted that the question mark character may be input through combined use of the command and content keys 206 and 204, respectively, in order to access grammatical characters not provided on the initially (e.g., default) displayed keyboard layout of the input panel 202. Alternatively, or additionally, the input management system 112 and/or the input recognition system 113 may process user interaction with the keyboard layout in order to recognize and predict the content being input, such as predicting interaction with the "h" key, which as shown in FIG. 2 also depicts a question mark, directly after the "y", "o" and "u" keys, is more likely to form "you?" rather than "youh", for example. Such recognition processing is described in detail later.

As shown in the depictions of the input stages of FIGS. 3 and 4, an input cursor 306 may be displayed in the display area 300 in accordance with the current input position with respect to the already input content 304, e.g., after the last input (displayed) character of the content 304. The display of the cursor 306 provides guidance for users as to where further input via the keyboard will be located with respect to the existing input and also feedback that an input mode is active, for example, which may be desired when the input panel and content field are displayed separately, e.g., on separate display devices.

As discussed in the background, conventionally when a user wishes to input content within the existing content or to edit that content, e.g., deletion of one or more characters or words, using a virtual keyboard it is necessary for the user to specify the position of that content. This is typically performed by the user interacting with the existing content, such as with a single-point gesture, e.g., a tap, and/or with the displayed cursor, such as with a multi-point gesture, e.g., a tap and slide on the cursor, for example. Such a mechanism is generally difficult to implement directly via the interface surface however, as often the users' finger or stylus obscures the displayed cursor and content, making final placement awkward. The present system and method provides an intuitive and efficient manner of editing existing content as an alternative or in addition to such a known mechanism as follows.

Figure 5:
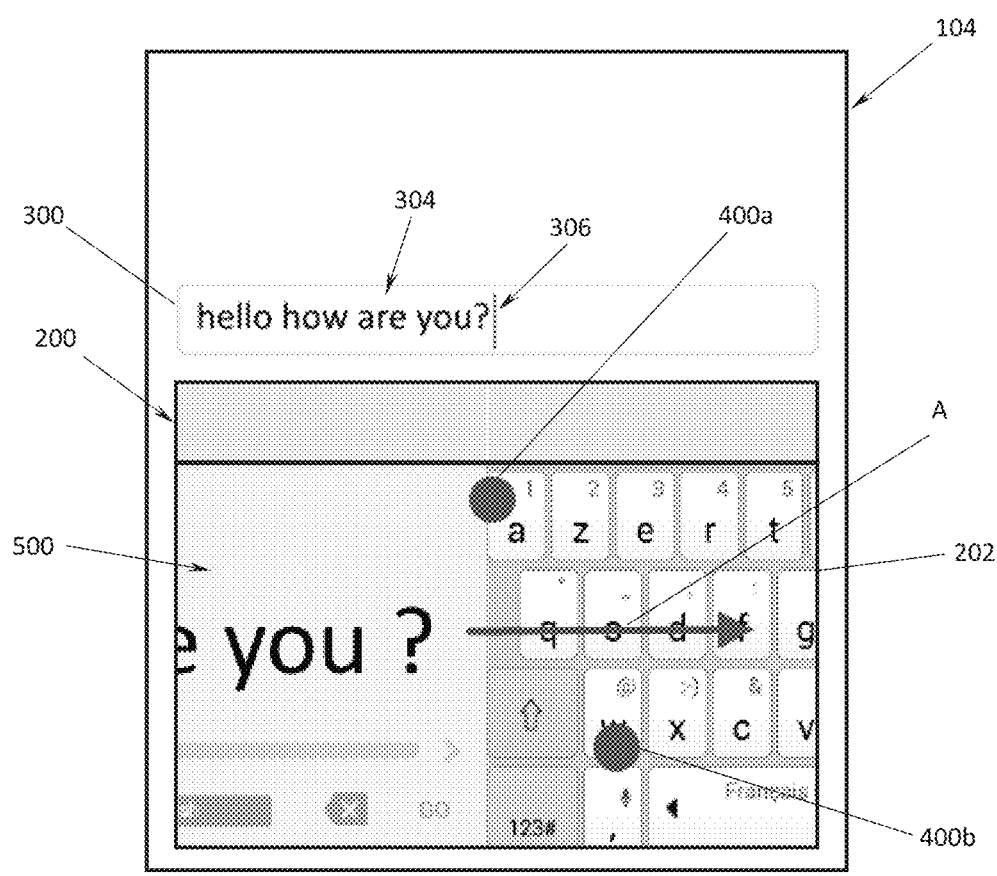
FIG. 5 shows the input area with a depiction of a gesture interaction for accessing an interaction panel of the input area.

In order to facilitate easier editing input, the input panel 202 of the input area 200 may display input interfaces other than the keyboard layout when an editing or interactive mode is active. This interactive mode is treated by the input management system 112 as being a mode in which further input may edit existing recognized input rather than adding to such existing input, as in the input mode described earlier. FIGS. 4 and 5 show an example manner in which such an interactive mode is commenced by detection of an (first) interaction with the input field 200 pre-determined with the input management system 112 to cause switching between the input and interaction modes.

In the example of FIG. 4, an interaction 400 having multiple-points 400a and 400b, such as a multi-point gesture, e.g., a two finger tap and slide or swipe in the direction of arrow A, on the input panel 202 is depicted. The input management system 112 and/or the input recognition system 113, is configured to detect such multi-point interaction as being a gesture rather than input of content on the input panel 202. This can be achieved by considering multiple, substantially simultaneous interactions with more than one of the keys 204 and 206 of the keyboard layout, as being a gesture input rather than content input, for example.

Figure 6:
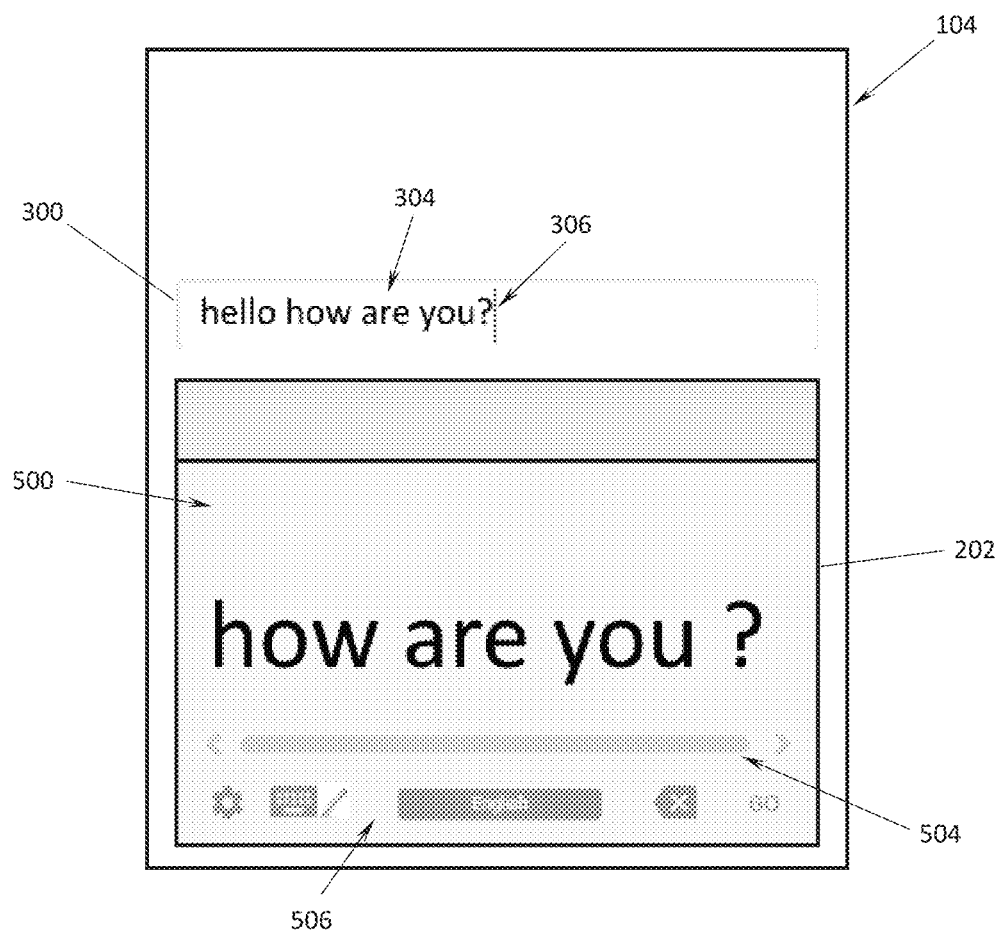
FIG. 6 shows an example of the interaction panel with a depiction of the example recognized content.

FIG. 5 shows the result of continued 'sliding' of the interaction 400 across the input panel 202, in response to which an interaction or editing area 500 of the input panel 202 for accepting a second type of input, e.g., handwriting, is partially displayed or revealed by the input management system 112, with partial display or concealment of the keyboard layout. FIG. 6 shows an example of the interaction panel 500 as fully revealed or displayed upon the cessation of the interaction 400 and/or in response to the initiation of the interactive mode by the input management system 112.

In the illustrated example, the interaction panel 500 is displayed as a handwriting input area or 'pad'. Such a handwriting pad may accept input handwriting on or over the input panel 202, rather than input via typing through interaction with the individual keys 204 of the keyboard layout. The illustrated gesture interaction type for initiating the interaction mode is merely an example and other types of interaction or gesture are possible. For example, the input field 200 may be configured so that detected and recognized handwriting input directly on the keyboard layout of the input panel 200 causes the display of the interaction panel 500, such as through gradual fading of the keyboard layout and display of the handwriting panel. This may be achieved, for example, by configuring the input management system 112 as described in U.S. patent application Ser. No. 15/132,514 titled "System and Method for Multiple Input Management" filed claiming a priority date of 2 Feb. 2016 in the name of the present Applicant and Assignee, the entire contents of which is incorporated by reference herein.

As can be seen, the interaction panel has content 502 corresponding to the content 304 displayed in the display area 300, e.g., the recognized objects "hello how are you?" rendered in typeset ink. Other rendering inks are possible however, such as digital ink if some or all of the recognized content was originally input using handwriting, for example. Like the display area 300, the interaction or interactive ink panel 500 is configured so that recognized content beyond what can be displayed in the interaction panel 500 may be scrolled from and into view either automatically, such as described in afore-incorporated by reference United States Patent Publication No. 2016/0070462, and/or through direct gesture interaction in the interaction panel 500 or via a displayed on-screen control 504, e.g., a scroll-bar in the illustrated example. As can be seen, other UI controls or buttons 506 may also be displayed in the interaction area 500 (as described later).

Figure 7:
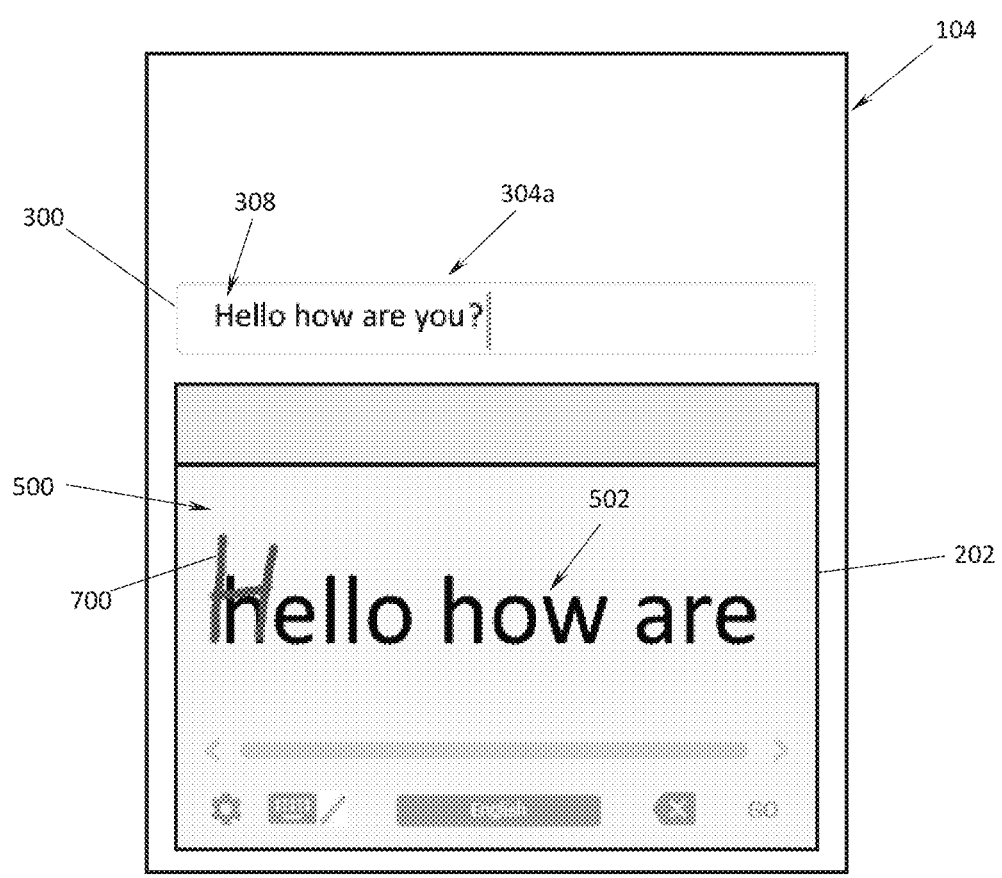
FIG. 7 shows the interaction panel with a depiction of example received input of a second type and consequential display of recognized content in the content area.

The recognized or existing input content is displayed in the interaction panel 500 so as to allow user interaction with the content for editing purposes. For example, FIG. 7 shows example (second interaction) handwriting input 700 detected as input as several strokes over-written on part of the recognized content 502. In response to handwritten input (second pre-determined type) in the interaction panel 500, the input management system 112 renders the handwriting as digital ink. In the case of the example of FIG. 7, the digital ink is rendered with the over-written part of the typeset ink already displayed. This is an example however and other renderings are possible in an over-writing case, such as omission of the over-written typeset ink.

A user may enter such strokes with a finger or some instrument such as a pen or stylus suitable for use with the input surface 104. The user may also enter a stroke by making a gesture above the input surface 104 if technology that senses motions in the vicinity of the input surface 104 is being used, or with a peripheral device of the computing device 100, such as a mouse or joystick. A stroke is characterized by at least the stroke initiation location, the stroke termination location, and the path connecting the stroke initiation and termination locations as captured by the input management system 112 and/or input recognition system 113. Further information such as timing, pressure, angle at a number of sample points along the path may also be captured to provide deeper detail of the strokes.

The input management system 112 is configured to detect the input of handwriting on the input panel 202 and cause the handwriting to be recognized by the input recognition system 113 under control of the processor 106, for example. The input recognition system 113 and any of its components, with support and compliance capabilities, may be a source program, executable program (object code), script, application, or any other entity having a set of instructions to be performed. When a source program, the program needs to be translated via a compiler, assembler, interpreter, or the like, which may or may not be included within the memory 108, so as to operate properly in connection with the operating system 110.

Furthermore, the input recognition system with support and compliance capabilities can be written as (a) an object oriented programming language, which has classes of data and methods; (b) a procedure programming language, which has routines, subroutines, and/or functions, for example but not limited to C, C++, Pascal, Basic, Fortran, Cobol, Perl, Java, Objective C, Swift, Python, C #and Ada; or (c) functional programming languages for example but no limited to Hope, Rex, Common Lisp, Scheme, Clojure, Racket, Erlang, OCaml, Haskell, Prolog, and F #.

Alternatively, the input recognition system 113 may be a method or system for communication with an input recognition system remote from the device, such as server or cloud-based system, but is remotely accessible by the computing device 100 through communications links using the afore-mentioned communications I/O devices of the computing device 100. Further, the input management system 112 and the input recognition system 113 may operate together or be combined as a single system.

Figure 8:
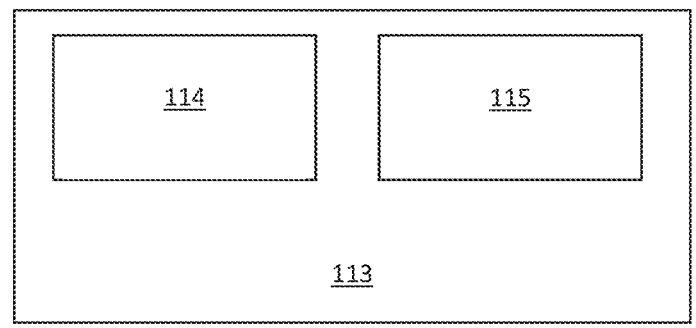
FIG. 8 shows a block diagram of a system for input recognition in accordance with an example of the present system and method.
Figure 9:
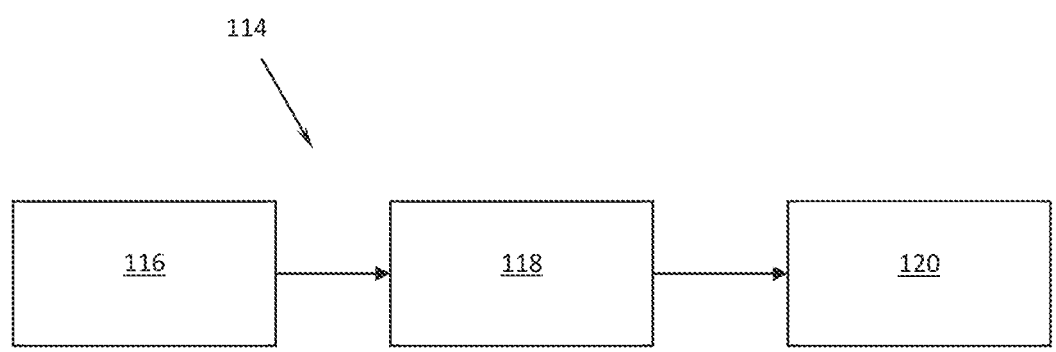
FIG. 9 shows a block diagram of a system for handwriting input recognition in accordance with an example of the present system and method.

FIG. 8 is a schematic pictorial of an example of the input recognition system 113, in either its local (i.e., loaded on the device 100) or remote (i.e., remotely accessible by the device 100) forms. The input recognition system 113 includes a handwriting recognition (HWR) system 114 as a first component and a keyboard recognition (KBR) system 115 as a second component. FIG. 9 is a schematic pictorial of an example of the HWR system 114. The HWR system 114 includes stages such as preprocessing 116, recognition 118 and output 120. The preprocessing stage 116 processes the digital ink to achieve greater accuracy and reducing processing time during the recognition stage 118. This preprocessing may include normalizing of the path connecting the stroke initiation and termination locations by applying size normalization and/or methods such as B-spline approximation to smooth the input. The preprocessed strokes are then passed to the recognition stage 118 which processes the strokes to recognize the objects formed thereby. The recognized objects are then output 120 to the display 102 generally as a typesetted version of the handwritten elements/characters as the afore-described digital objects displayed in the output area 300, for example.

Figure 10:
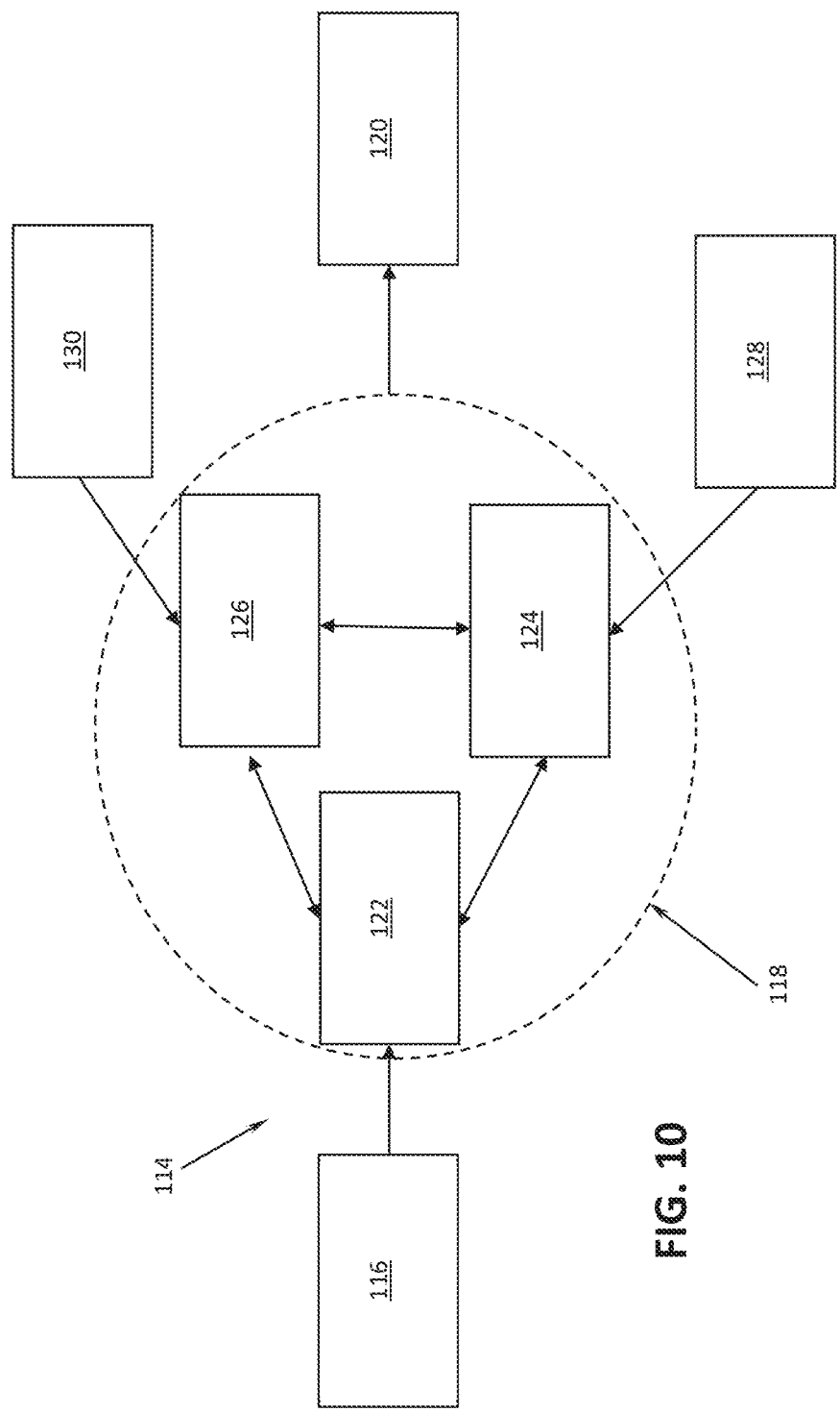
FIG. 10 shows a block diagram illustrating detail of the handwriting input recognition system of FIG. 9 in accordance with an example of the present system and method.

The recognition stage 118 may include different processing elements or experts. FIG. 10 is a schematic pictorial of the example of FIG. 9 showing schematic detail of the recognition stage 118. Three experts, a segmentation expert 122, a recognition expert 124, and a language expert 126, are illustrated which collaborate through dynamic programming to generate the output 120. Because different users may naturally write the same object, e.g., a letter, a shape, a symbol, with slight variations, the HWR system accommodates a variety of ways in which each object may be entered whilst being recognized as the correct or intended object.

The segmentation expert 122 defines the different ways to segment the input strokes into individual element hypotheses, e.g., alphanumeric characters and mathematical operators, text characters, individual shapes, or sub expression, in order to form expressions, e.g., words, mathematical equations, or groups of shapes. For example, the segmentation expert 122 may form the element hypotheses by grouping consecutive strokes of the original input to obtain a segmentation graph where each node corresponds to at least one element hypothesis and where adjacency constraints between elements are handled by the node connections. Alternatively, the segmentation expert 122 may employ separate experts for different input types, such as text, drawings, equations, and music notation.

The recognition expert 124 provides classification of the features extracted by a classifier 128 and outputs a list of element candidates as possible recognition objects with probabilities or recognition scores for each node of the segmentation graph. Many types of classifiers exist that could be used to address this recognition task, e.g., Support Vector Machines, Hidden Markov Models, or Neural Networks such as Multilayer Perceptrons, Deep, Convolutional or Recurrent Neural Networks. The choice depends on the complexity, accuracy, and speed desired for the task.

The language expert 126 generates linguistic meaning for the different paths in the segmentation graph using language models (e.g., grammar or semantics). The expert 126 checks the candidates suggested by the other experts according to linguistic information 130. The linguistic information 130 can include a lexicon, regular expressions, etc. and is the storage for all static data used by the language expert 126 to execute a language model. A language model can rely on statistical information on a given language. The linguistic information 130 is computed off-line, with or without adaption according to the results of recognition and user interactions, and provided to the linguistic expert 126. The language expert 126 aims at finding the best recognition path. In one example, the language expert 126 does this by exploring a language model such as finite state automaton (FSA) representing the content of linguistic information 130. In addition to the lexicon constraint, the language expert 126 may use a language model with statistical information modeling for how frequent a given sequence of elements appears in the specified language or is used by a specific user to evaluate the linguistic likelihood of the interpretation of a given path of the segmentation graph.

When in the interaction mode, the present system and method take account of the context in which the handwriting input is received. That is, the existing content 502 is considered as part of the language model implemented by the input recognition system 113 (and the input management system 112) is configured to consider the recognized handwritten strokes in the context of the proximate existing content. That is, the digital object(s) being interacted with or near to that interaction, through handwriting are used as context for recognizing the handwritten input.

For example, in FIG. 7 the input handwritten strokes 700 are over-written on the word "hello" of the previously recognized content 502. In particular, the input management system 112 and/or the input recognition system 113 detects that the editing strokes 700 are made over the character "h" of the recognized word "hello". This relative location is detected based on the display resolution of the input interface 104, for example, in a manner well understood by one skilled in the art. Based on this detection, the HWR system 114 for example may consider the hypothesis that the input 700 corresponds to the capitalized letter "H", therefore forming the capitalized word "Hello" in place of the existing non-capitalized word "hello", as being more (or most) likely out of any other hypotheses considered for the input 700. Accordingly, the input management system 112 causes the content 304 displayed in the content area 300 to be updated to reflect this replacement character such that updated content 304a is displayed with newly recognized content 308, being the edited word "Hello". As such, the updated content 304a corresponds to the recognized object(s) "Hello how are you?".

Alternatively, or additionally, the present system and method may cause at least part of the list of candidates returned by the recognizer 114 (and the recognizer 115, as described later) to be rendered as digital objects or typeset ink in a candidate display area 208 of the input panel 202. Such a list is interactive for users to select candidates for display in the content area 300, for example, as described in the afore-incorporated by reference U.S. patent application Ser. No. 15/132,514.

The knowledge of the present system and method of the previously recognized content may be retained, such as in the memory 108 for example, and utilized by treating all recognized content as ink objects regardless of the input method used, e.g., keyboard, handwriting. Such ink objects are formed by the input management system 112 by mapping the recognition result(s) to the displayed digital or typeset ink in the input area (and also the content area, if desired). Such mapping may be performed as described in U.S. patent application Ser. No. 15/083,195 titled "System and Method for Digital Ink Interactivity" filed claiming a priority date of 7 Jan. 2016 in the name of the present Applicant and Assignee, the entire contents of which is incorporated by reference herein.

With respect to the previously recognized content, e.g., the content 304, entered as typed input using the keyboard layout, the KBR system 115 represents the afore-mentioned keyboard or typing decoder which interprets the single-point gestures or 'keystrokes' on the keyboard layout. That is, the KBR system 115 determines the keyboard layout, from the plurality of possible keyboard layouts that could be displayed as stored in the memory 108 of the digital device 100, for example, which is being interacted with in the input panel 202 and therefore the relative positions of any keystrokes in the input panel 202 are mapped to the keys 204 and 206 of the present keyboard layout. From this mapping, the KBR system 115 determines the character(s) or functions corresponding to the interacted keys 204 and 206 and outputs the determined character(s) for rendering as the objects within the output area 300 and enacts commands, such as keyboard layout change, menu launching and editing operations on the recognized content in the display area 300, for example.

Keyboard layout change may also be provided by interaction with the input panel 202 such as input of a multiple-point gesture, like swiping, in order to 'reveal' display of different keyboard layouts. Such a gesture for changing keyboard layout is set to be different than the interaction mode switch gesture, e.g., in the illustrated examples two substantially simultaneous point interactions together with swiping on the keyboard layout is required for the interaction mode switching, whereas a single point interaction together with swiping may be required for keyboard layout switching.

The KBR system 115 may use 'one-to-one' or non-fuzzy logic to interpret the keystrokes such that a key having the greatest gesture surface area of interaction is determined as the key intended by the user for input. That is, since a virtual keyboard does not have physical 'keys' and the size of the device display 102 may limit the size of the keys within the keyboard layout and the spacing therebetween, it is possible that users will strike more than one key substantially simultaneously. Such multiple keystrokes make interpretation of the intended key 'press' uncertain. Using non-fuzzy logic rules, such as the above superior area rule, provide one way of dealing with this uncertainty.

The KBR system 115 may alternatively utilize fuzzy logic in order to handle such multiple keystrokes. With such fuzzy keyboard logic, the KBR system 115 provides key candidates as possible recognition objects based on which keys have been interacted with, including multiple interactions with single keys on reduced size keyboard layouts having limited keys displayed, e.g., multiple taps in order to access alternates to the displayed character keys, such as accents, upper/lower case, language changes, symbols, numbers, etc., and assigns probability scores for the keys based on parameters, like the relative areas of key interaction or other well-known prediction methods. Alternatively, the KBR system 115 may employ probability processing similar to the HWR system 114 (described in more detail later).

The input management system 112 of the present system and method may also accept stroke-like or continuous typing input through configuration of the KBR system 115 to recognize the correspondence of 'long' stroke input and the underlying keys 204 and 206 of the keyboard, for example. The processing utilized by the KBR system 115 to achieve this recognition may be similar to known methods. These methods generally involve tracking the path of the stroke over the keys of the keyboard with or without application of fuzzy logic to account for inter-key paths and considering points of inflection in the path spatially and/or temporally, e.g., changes in direction, curvature, slowing down and speeding up, and the track starting and termination points, in relation to the underlying keys. These indicator points of the path are mapped to the underlying keys, and hypotheses of key candidates are tested for probable character, word, symbol, commands, etc.

Accordingly, regardless of the input type the present system and method may form ink objects from the recognized content as described earlier. With respect to the handwritten interactions with the ink objects, the display of the digital ink corresponding to the handwritten input may be ceased upon return and display of the recognition result in the content area 300 and/or the interaction panel 500. The timing and manner of the removal of the digital ink display may be provided in a number of ways. For example, in the example of FIG. 7 the digital ink 700 is displayed with the new recognition result 308 being displayed in the content area 300. This provides visual feedback for users that not only their handwriting input has been recognized but the edit on the existing content has also been interpreted as it was intended. Alternatively, the display of the digital ink 700 may be ceased as soon as the recognition result 308 is displayed. In this case, the digital ink may be displayed for a certain length of time (e.g., about 0.2 seconds to about 0.5 seconds) then removed as the recognition result is displayed.

Alternatively, the display of the recognition result is made more quickly (e.g., as soon as the result is returned by the input recognition system 113) and the digital ink remains displayed for a certain length of time thereafter (e.g., about 0.2 seconds to about 0.5 seconds) then removed, or is removed as soon as an interaction for ceasing the interaction mode is received, or as soon as new handwriting input is received and/or displayed as new digital ink, or after a certain time has elapsed e.g., about 0.2 seconds to about 0.5 seconds) after receipt of subsequent handwritten input in an example of the present system and method in which superimposed handwritten input is accepted, for example, as described in United States Patent Publication Nos. 2015/0286886 and 2015/0356360 filed in the name of the present Applicant and Assignee, the entire contents of which is incorporated by reference herein. The removal of display of the digital ink may be made in a gradual manner with fading of the digital ink rendering, for example.

Figure 11:
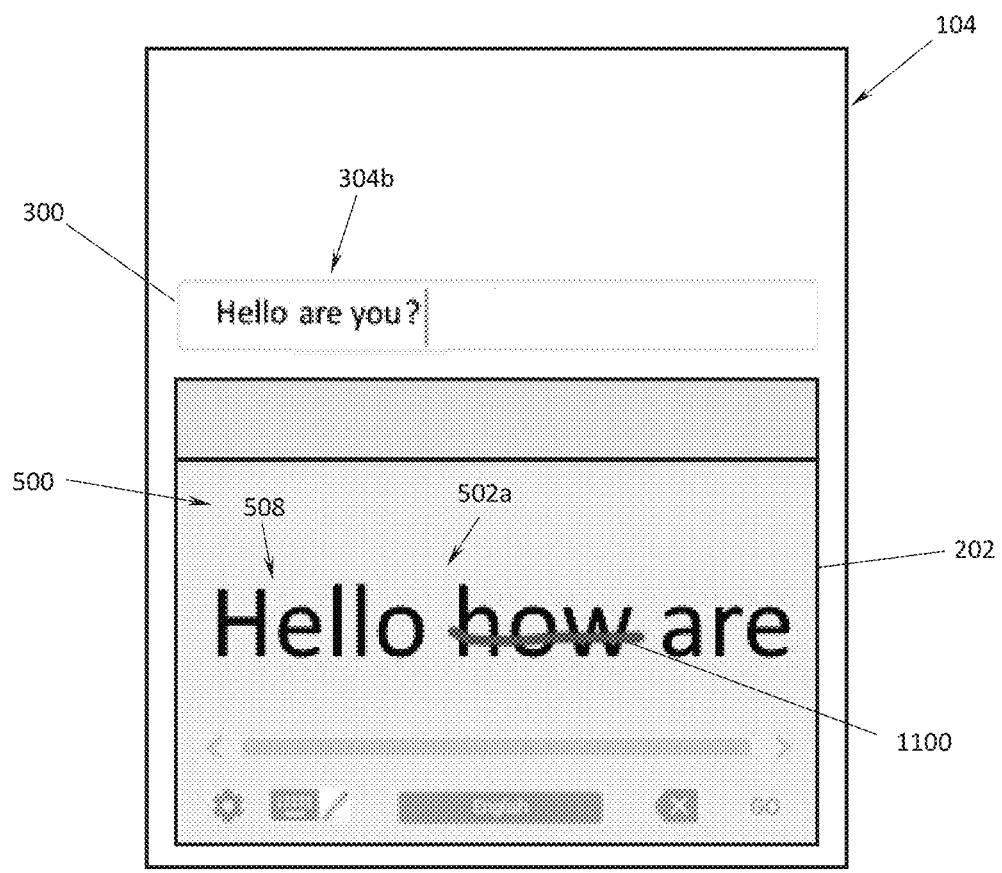
FIG. 11 shows the interaction panel with a depiction of another example received second type input and consequential display of recognized content in the content area.

When the digital ink is removed from display, the interaction content 502 is updated to reflect the new recognition result. For example, FIG. 11 shows the interaction content 502 updated with the replacement character "H" such that updated interaction content 502a is displayed with newly recognized content 508, being the edited word "Hello". As such, the updated interaction content 502a corresponds to the recognized object(s) "Hello how are you?".

Over-writing of the existing recognized or interaction content through one or more gestures or strokes of handwriting, as in the example input 700 of FIG. 7, to replace at least part of the recognized content is merely one interaction example of the present system and method. For example, over-writing may be used to delete at least part of the recognized content. It is understood that such deletion is similar to replacement, however the replaced content is null content.

FIG. 11 shows an over-writing example for deletion, in which handwriting input 1100 as a single stroke is detected as over-written on part of the recognized content 502a. In particular, the editing stroke 1100 is over-written on the word "how" of the recognized content 502a. In response, the input management system 112 and/or the input recognition system 113 detects that the handwritten stroke is made over the entirety of the recognized word "how" and displays the corresponding digital ink to provide recognition feedback to the user under the above-described example timing and/or event metrics.

Based on this detection, the HWR system 114 for example may consider the hypothesis that the input 1100 corresponds to a deletion or strike-through gesture which deletes the existing word "how", as being more (or most) likely out of any other hypotheses considered for the input 1100. Accordingly, the input management system 112 causes the content 304a displayed in the content area 300 to be updated to reflect this deletion such that updated content 304b is displayed as newly recognized content corresponding to the recognized object(s) "Hello are you?". The present system and method may detect handwritten editing gestures, such as the strike-through gesture 1100, which are by nature different than handwritten content and akin more to handwritten commands, for example, as described U.S. patent application Ser. No. 14/989,217 titled "System and Method for Note Taking with Gestures" filed claiming a priority date of 1 Dec. 2015 in the name of the present Applicant and Assignee, the entire contents of which is incorporated by reference herein.

When the digital ink of the gesture 1100 is removed from display, the current interaction content 502a is further updated to reflect the new recognition result. For example, FIG. 12 shows the interaction content 502a updated with the word "how" deleted such that updated interaction content 502b is displayed corresponding to the recognized object(s) "Hello are you?".

Direct interaction with the ink objects of existing recognized or interaction content through one or more gestures or strokes of handwriting, as in the examples of FIGS. 7 and 11, is merely an example of one interaction type of the present system and method. For example, interactions may be used to add space between ink objects of the recognized content. FIG. 12 shows a space insertion example, in which handwriting input 1200 as a single stroke is detected as input as a top-to-bottom vertical line in a single gesture or stroke in the displayed position shown by a user swiping their finger or stylus tip from the top to the bottom in the displayed position shown, for example. That is, the stroke start position is above the stroke end position, in time order, as depicted by the gradual thickening of the stroke from the top to the bottom. This, or other, depiction of the detected gesture may be provided as digital ink by the present system and method to provide recognition feedback to the user under the above-described example timing and/or event metrics.

In particular, the editing stroke 1200 passes between the recognized elements "there" and "?" of the recognized content 502*b*. In response, the input management system 112 and/or the input recognition system 113 detects that the handwritten stroke is made between the recognized word "there" and the recognized punctuation mark "?". Based on this detection, the HWR system 114 for example may consider the hypothesis that the input 1200 corresponds to a space insertion gesture which adds space between, or to existing space between, the recognized elements as being more (or most) likely out of any other hypotheses considered for the input 1200. Accordingly, the input management system 112 causes the content 304*b* displayed in the content area 300 to be updated to reflect this space insertion such that updated content 304*c* is displayed as newly recognized content corresponding to the recognized object(s) "Hello are you?".

Figure 12:
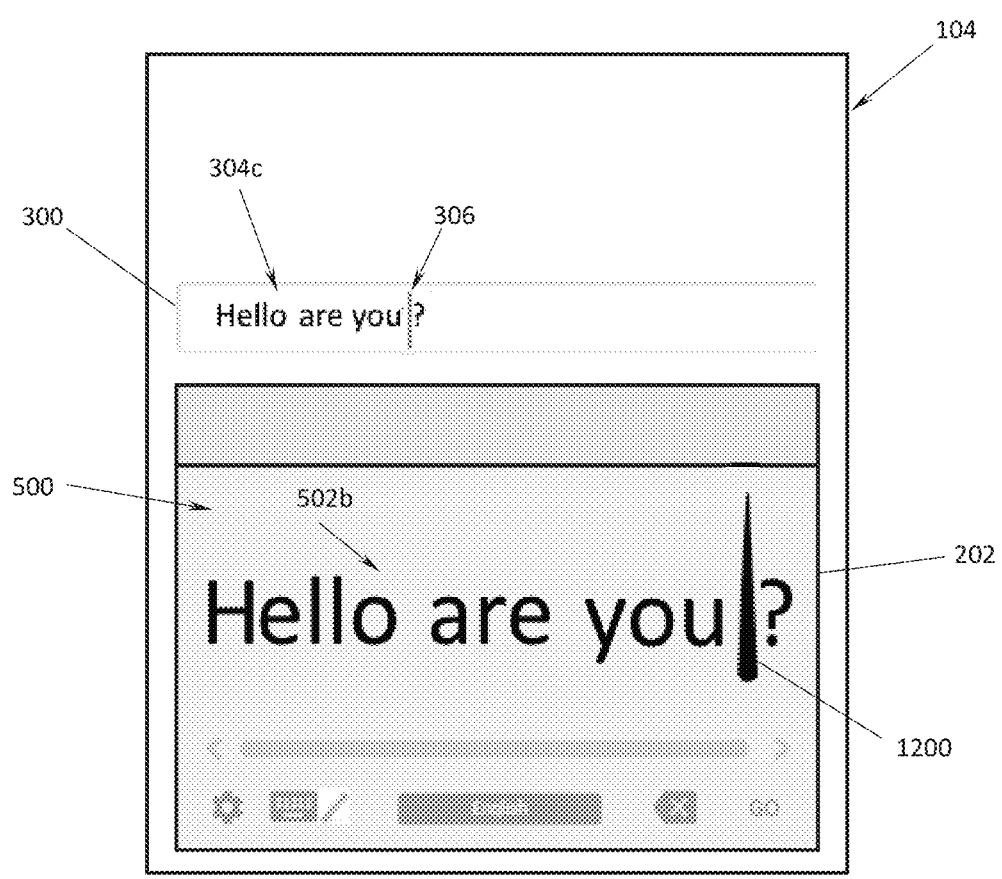
FIG. 12 shows the interaction panel with a depiction of another example received second type input and consequential display of recognized content in the content area.

Further, the input management system 112 may manage the cursor 306 to be positioned at the location of the newly entered space in the updated recognized content, e.g., the space between "there" and "?" in the updated content 304*c* as shown in FIG. 12. This provides guidance to users that subsequent input will be entered at this location, unless the user moves the cursor to define another location, e.g., the user may want to add extra space between words or elements or break or split a word into separate elements rather than add further elements at that location, as described in afore-incorporated by reference U.S. patent application Ser. No. 14/989,217.

Figure 13:
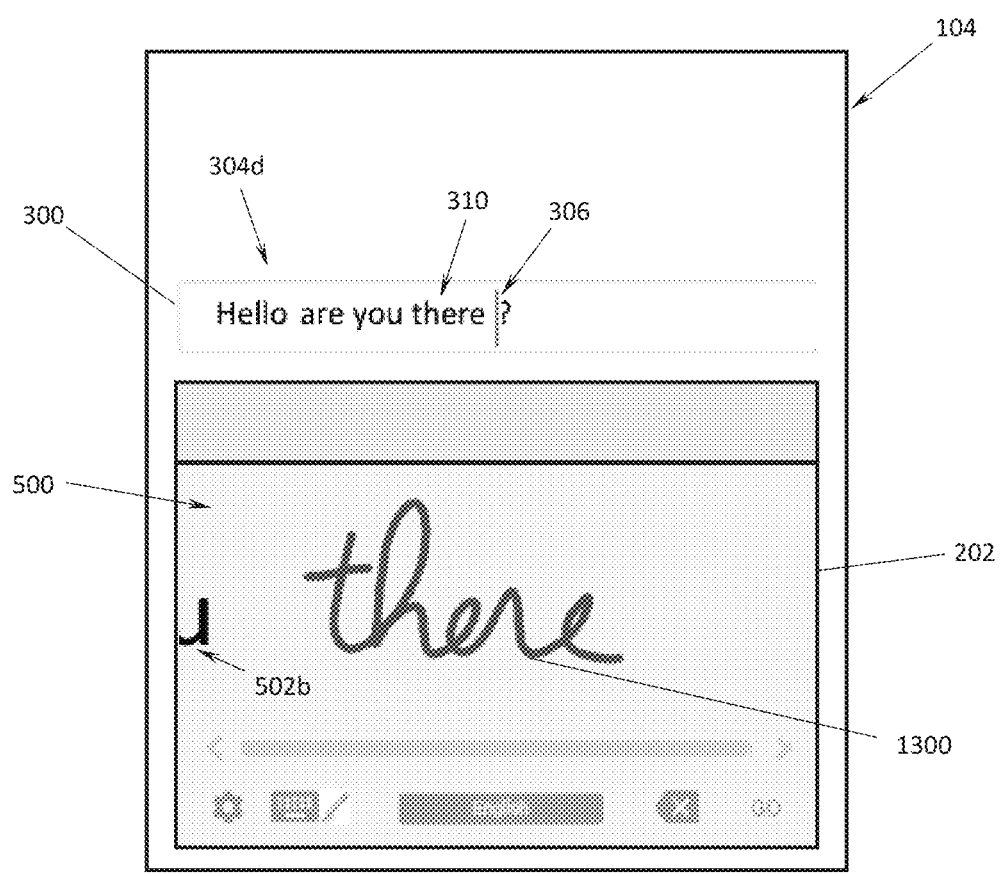
FIG. 13 shows the interaction panel with a depiction of another example received second type input and consequential display of recognized content in the content area.

When the digital ink of the gesture 1200 is removed from display, the display of the current interaction content 502*b* is changed so as to allow the handwritten input of further content in the interaction panel 500. For example, FIG. 13 shows the interaction content 502*b* displayed so that (at least) a terminal part of the recognized content element adjacent the left of the added space, e.g., the character "u" of the word "you", is displayed and other elements to the right of the added space, e.g., the question mark "?", is omitted from display (or moved to the right extent of the interaction panel 500). Accordingly, users are provided with space on the input panel 202 for further content input.

FIG. 13 shows example handwriting input 1300 detected as input as two strokes. In response to this handwritten input in the interaction panel 500, the input management system 112 renders the handwriting as digital ink 1300. Based on the detection, the HWR system 114 for example may consider the hypothesis that the input 1300 corresponds to the word "there" as being more (or most) likely out of any other hypotheses considered for the input 1300. Accordingly, the input management system 112 causes the content 304*c* displayed in the content area 300 to be updated to reflect this newly entered word such that updated content 304*d* is displayed with newly recognized content 310, being the new word "there" in the detected location. As such the updated content 304*d* corresponds to the recognized object(s) "Hello are you there?". It is noted in the depiction of FIG. 13 the cursor 306 is shown in the next spaced position for receipt of further input, if desired. This is an example however and the input management system 112 may retain the cursor proximate the end of the previously recognized input element.

The digital ink 1300 is displayed by the input management system 112 under the above-described example timing and/or event metrics, and when removed, the display of the current interaction content 502*b* is further updated (see terminal part of updated interaction content 502*c* in FIG. 14, for example) to reflect the new recognition result, as described earlier. However, regardless of digital or typeset ink display of the new recognition result, the availability of space within the interaction panel 500 is retained in order to allow entry of further input by scrolling of the interaction content 502. This may be performed, for example, as described in the afore-incorporated by reference United States Patent Publication No. 2016/0070462 and/or with the scroll-bar 504 or the like.

Figure 14:
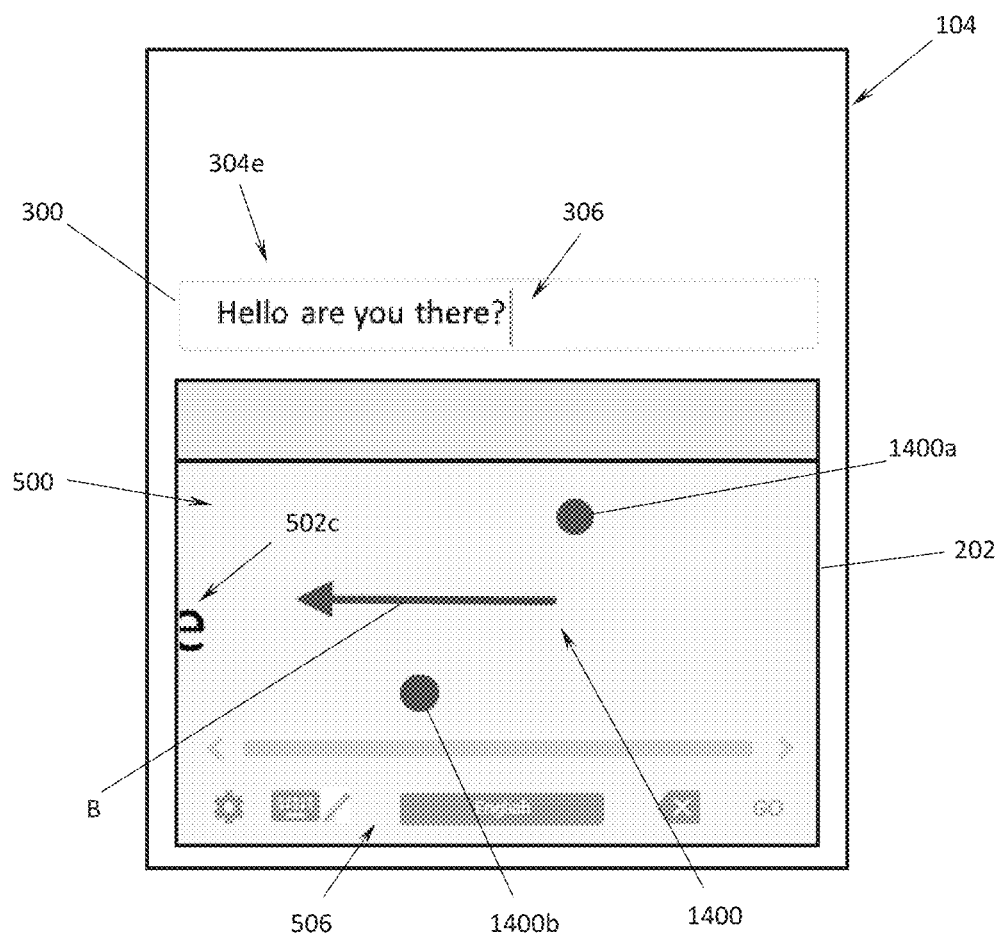
FIG. 14 shows the interaction panel with a depiction of a gesture interaction for ceasing access to the interaction panel of the input area.

When editing of, or insertion of new content within, the existing content is completed or otherwise no longer desired by users, the interactive mode may be ceased through similar operation to the initiation of the interaction mode. For example, FIG. 14 shows an interaction 1400 as multiple-points 1400*a* and 1400*b*, such as a multi-point gesture, e.g., a two finger tap and slide or swipe in the direction of arrow B (shown as substantially opposite to the direction of arrow A, however the same direction could be used), on the input panel 202. The input management system 112 and/or the input recognition system 113, is configured to detect such a multi-point interaction as being a gesture rather than input of content on the input panel 202, as described earlier. This interaction type is merely an example however, and other types of interaction or gesture are possible.

Alternatively, or additionally, the interactive controls 506 of the interaction panel 500 may be used to end the interaction mode, e.g., through detection of user interaction with a keyboard icon or the like. Further, interaction directly with the content area 300 may be interpreted by the input management system 112, either automatically or with an interactive message prompt display to the user, as the ending of the interaction mode.

Upon detection of the interaction mode gesture or other mode ending control, the input management system 112 may cause the content 304*d* displayed in the content area 300 to be updated to reflect the ending of the interaction mode such that updated content 304*e* is displayed as shown in FIG. 14 in which the extra space between the newly entered word 310, being "there", and the existing content, being the question mark "?" is omitted and the cursor 306 is returned to the input mode position, e.g., after the recognized content 304*e*. This is an example however and the input management system 112 may retain the additional space and/or cursor position during the interaction mode gesture.

Figure 15:
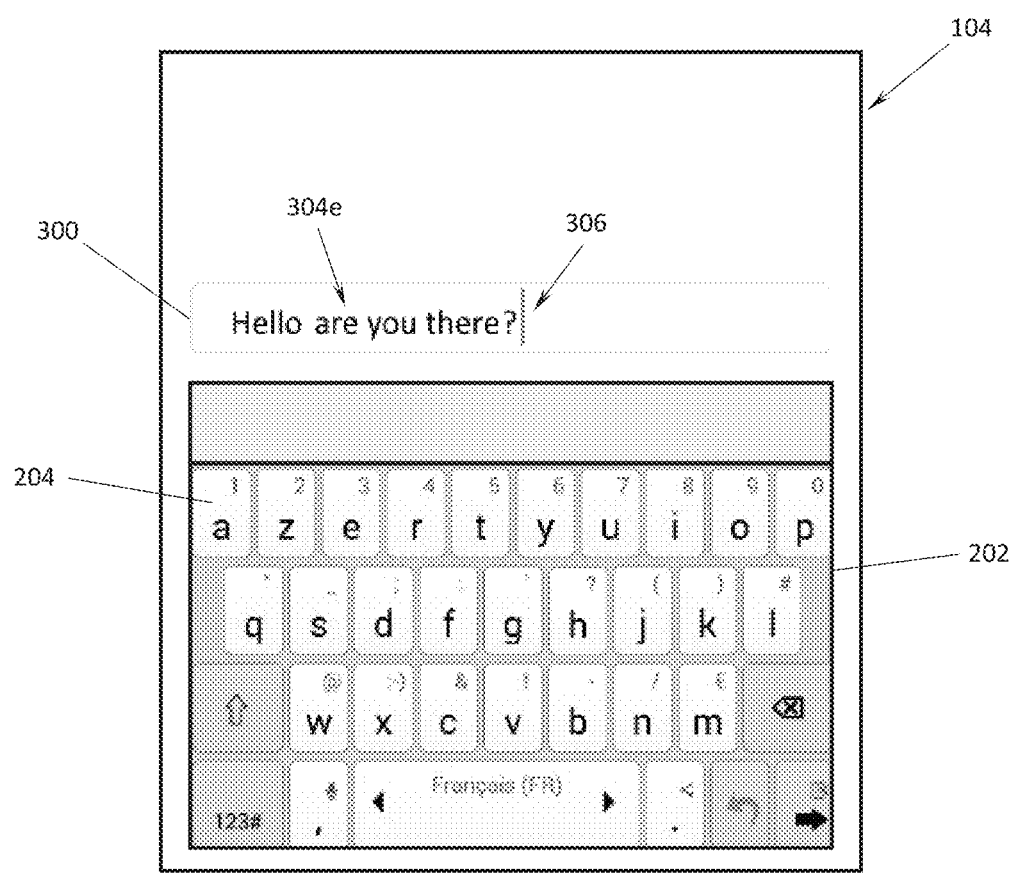
FIG. 15 shows the input area with the recognized content displayed in the content area.

FIG. 15 shows the result of continued 'sliding' of the interaction 1400 across the input panel 202, in response to which the interaction or editing area 500 is omitted from display by the input management system 112 and the keyboard layout is again revealed (with the partial views like FIG. 5) and the edited content 304*e* is displayed in the content area 300.

The present system and method provides a relatively simple but highly effective and intuitive way of providing editing of digital content using multiple input modes. User-initiated scrolling of a virtual keyboard to reveal an interactive ink panel replacing the keyboard layout with previously entered and/or recognized content, including text and non-text, provides users with the ability to edit content, such as:

overwrite any part of the content by handwriting directly on the content,
    remove content, such as whole or parts of words,
    add new content within the content, such as corrections, words or grammatical marks,
    insert space,
    insert line breaks.

Further, the present system and method provides a similarly relatively simple way of switching between editing and input modes, such as returning to a virtual keyboard from an interactive ink panel which replaced the keyboard layout previously such as by:

scrolling until the end of the previously entered content on the interactive ink panel, pressing a shortcut button to go directly to the end or beginning of the content, tapping within a content display field, faster processing of modification, insertion and deletion.

In the present system and method the input fields for each mode of input, e.g., general content entry and editing of that content, substantially occupy the same space of the digital device display. Alternatively, or additionally, a single input filed may be provided for both modes. As such, the present system and method is applicable to a wide range of digital devices. Further, the speed and accuracy of processing of editing commands, such as modification, insertion and deletion of content, is increased over the use of a conventional typing tools such as keyboard command key, e.g., backspace, space, directional arrows, and mouse and/or gesture, to control an input cursor alone. As such, users are enabled to manage their previously entered content using interactive ink thereby reducing effort and increasing productivity.

While the foregoing has described what is considered to be the best mode and/or other examples, it is understood that various modifications may be made therein and that the subject matter disclosed herein may be implemented in various forms and examples, and that they may be applied in numerous other applications, combinations, and environments, only some of which have been described herein. Those of ordinary skill in that art will recognize that the disclosed aspects may be altered or amended without departing from the true spirit and scope of the subject matter. Therefore, the subject matter is not limited to the specific details, exhibits, and illustrated examples in this description. It is intended to protect any and all modifications and variations that fall within the true scope of the advantageous concepts disclosed herein.

I claim:

1. A system for managing editing of content on computing devices, each computing device comprising a processor and at least one non-transitory computer readable medium storing a computer readable program for recognizing input under control of the processor, the computer readable program, when executed by the processor, configured to:

cause display of, on a display interface of a computing device, a content display area for displaying a first content;

cause display of, on the display interface, an input field for accepting input of a first type;

cause display of, on the display interface, a concealed interaction field for accepting input of a second type in place of the display of the input field based on detection of a first interaction with the display interface, wherein the interaction field includes a duplicate display of at least a portion of the first content based on the first input type, wherein the portion of the first content based on the first input type is simultaneously displayed on the display interface in both the interaction field and the content display area;

detect a second interaction at the interaction field with the first content displayed in duplicate display of the interaction field based on recognition of the second type input;

cause display of, on the duplicate display of the interaction field, second content based on the recognition of the second type input overlaid with the at least a portion of the first content, wherein the overlaid second type input comprises at least one of an overwrite, a strikethrough, an addition, a deletion, or a format modification;

cause modification of the first content based on the detected second interaction to create modified first content; and cause display of, on the content display area, modified first content based on the detected second interaction without the second content.

2. The system according to claim 1, wherein the input field is a virtual keyboard layout and the first input type input is typing.

3. The system according to claim 1, wherein the interaction field is a handwriting panel and the second input type input is handwriting.

4. The system according to claim 1, wherein the first interaction is of a first pre-determined type and the second interaction is of a second pre-determined type, the first and second pre-determined types being different.

5. The system according to claim 4, wherein the second pre-determined type comprises any one of a content overwriting gesture, a content deletion gesture and a content space insertion gesture.

6. The system according to claim 1, the at least one non-transitory computer readable medium configured to cause display of, on the display interface, the input field in place of the interaction field based on detection of the first interaction with the display interface.

7. A method for managing editing of content on computing devices, each computing device comprising a processor and at least one non-transitory computer readable medium for recognizing input under control of the processor, the method comprising:

displaying a content display area for displaying a first content;

displaying an input field for accepting input of a first type;

displaying a concealed interaction field for accepting input of a second type in place of the display of the input field based on detection of a first interaction, the interaction field including a duplicate display of at least a portion of the first content based on the first input type, wherein the portion of the first content based on the first input type is simultaneously displayed on the display interface in both the interaction field and the content display area;

detecting a second interaction at the interaction field with the first content displayed in the duplicate display of the interaction field based on recognition of the second type input;

displaying on the duplicate display of the interaction field, second content based on the recognition of the second type input overlaid with the at least a portion of the first content, wherein the overlaid second type input comprises at least one of an overwrite, a strikethrough, an addition, a deletion, or a format modification;

causing modification of the first content based on the detected second interaction to create modified first content; and causing display of, on the content display area, modified first content based on the detected second interaction without the second content.

8. The method according to claim 7, wherein the input field is a virtual keyboard layout and the first input type input is typing.

9. The method according to claim 7, wherein the interaction field is a handwriting panel and the second input type input is handwriting.

10. The method according to claim 7, wherein the first interaction is of a first pre-determined type and the second interaction is of a second pre-determined type, the first and second pre-determined types being different.

11. The method according to claim 10, wherein the second pre-determined type comprises any one of a content overwriting gesture, a content deletion gesture and a content space insertion gesture.

12. The method according to claim 7, further comprising the step of displaying the input field in place of the interaction field based on detection of the first interaction.

13. A non-transitory computer readable medium having a computer readable program code embodied therein, said computer readable program code adapted to be executed to implement a method for managing editing of content on computing devices, each computing device comprising a processor and at least one non-transitory computer readable medium for recognizing input under control of the processor, the method comprising:
  displaying a content display area for displaying a first content;
  displaying an input field for accepting input of a first type;
  displaying a concealed interaction field for accepting input of a second type in place of the display of the input field based on detection of a first interaction, the interaction field including a duplicate display of at least a portion of the first content based on the first input type,
    wherein the portion of the first content based on the first input type is simultaneously displayed on the display interface in both the interaction field and the content display area;
  detecting a second interaction at the interaction field with the first content displayed in the duplicate display of the interaction field based on recognition of the second type input;
  displaying on the duplicate display of the interaction field, second content based on the recognition of the second type input overlaid with the at least a portion of the first content,
    wherein the overlaid second type input comprises at least one of an overwrite, a strikethrough, an addition, a deletion, or a format modification;
  causing modification of the first content based on the detected second interaction to create modified first content; and
  causing display of, on the content display area, modified first content based on the detected second interaction without the second content.

14. The non-transitory computer readable medium according to claim 13, wherein the input field is a virtual keyboard layout and the first input type input is typing.

15. The non-transitory computer readable medium according to claim 13, wherein the interaction field is a handwriting panel and the second input type input is handwriting.

16. The non-transitory computer readable medium according to claim 15, further comprising the step of displaying the input field in place of the interaction field based on detection of the first interaction.

17. The non-transitory computer readable medium according to claim 13, wherein the first interaction is of a first pre-determined type and the second interaction is of a second pre-determined type, the first and second pre-determined types being different.

18. The non-transitory computer readable medium according to claim 17, wherein the second pre-determined type comprises any one of a content overwriting gesture, a content deletion gesture and a content space insertion gesture.

* * * * *